Oct. 16, 1934.  E. E. HEWITT  1,976,849

VALVE

Filed June 11, 1932

INVENTOR.
ELLIS E. HEWITT
BY *Wm. N. Cady*
ATTORNEY.

Patented Oct. 16, 1934

1,976,849

UNITED STATES PATENT OFFICE 1,976,849

VALVE

Ellis E. Hewitt, Edgewood, Pa., assignor to The Westinghouse Air Brake Company, Wilmerding, Pa., a corporation of Pennsylvania Application June 11, 1932, Serial No. 616,680

3 Claims. (Cl. 251—144)

This invention relates to valve structures and particularly to check valve devices such as are employed in the controlling valve devices of fluid pressure brake equipment.

An object of the invention is to provide a check valve device, wherein means are provided to permit fluid under pressure to flow freely between the valve and stop member therefor for limiting opening movement of the valve.

A further object of the invention is to provide a valve device of simple and inexpensive construction that is rugged and capable of affording long service without attention.

Figure 1:
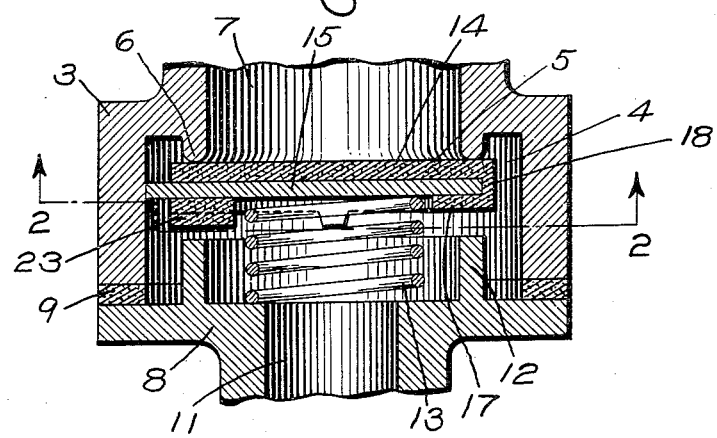
Figure 2:
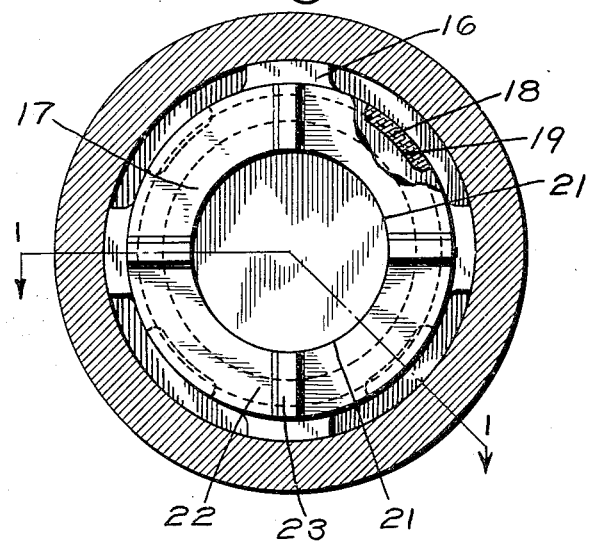

These and other objects of the invention, that will be made apparent throughout the further description thereof, are attained by means of a valve structure hereinafter described and illustrated in the accompanying drawing; wherein Fig. 1 is a sectional view of a check valve device embodying features of the invention; and Fig. 2 is a transverse sectional view, partly in elevation, of the check valve device shown in Fig. 1, the section being taken on line 2—2 of Fig. 1.

Referring to the drawing, the valve structure comprises a casing 3 having a chamber 4 therein for receiving a disc valve 5 that is normally seated upon a valve seat rib 6 which surrounds a passage 7 opening into the chamber 4.

A cover 8 that is secured to the casing 3 with a gasket 9 therebetween, serves to close the chamber 4. The cover is secured to the casing by means of bolts or screws, not shown, and is provided with a passage 11 which opens into the chamber 4. The cover 8 is also provided with an annular stop flange 12, which serves to engage a face of the valve 5 and limit the opening movement thereof. The valve is normally urged toward the valve seat rib 6 by a spring 13, that is interposed between the valve and the cover 8 as indicated in Fig. 1.

The disc valve 5 comprises a body 14 of yielding material, such as rubber composition, in which a valve guide disc 15 is embedded, the disc being provided with guide members 16, which extend radially from the edge of the body 14 and slidably engage the walls of the chamber 4 and center the disc within the chamber. The body of the disc valve on one side of the disc 15 is flat and is adapted to make sealing engagement with the valve seat rib 6. The body of the valve disc on the other side of the disc 15 comprises an annular portion 17, that is integrally joined to the body by means of the material 18 extending across notches 19 in the peripheral edge of the disc 15 as shown in Figs. 1 and 2.

The central portion of the metal disc 15, surrounded by the annular body portion of the valve disc, is exposed and is adapted to be engaged directly by the spring 13, which is centered in the central opening 21 of the annular body portion 17 of the disc valve.

In order to provide free passage of fluid under pressure from the passage 7 past the valve disc 5 to the passage 11 in the cover 8, the annular portion of the valve body is castellated in order to provide notches 22 between projections 23, through which fluid under pressure may flow from the chamber 4 between the valve 5 and the stop flange 12 to the passage 11 when the valve 5 is opened and the projections 23 are in engagement with the stop flange 12.

It is apparent from the foregoing that a simple and inexpensive valve structure is provided, wherein a free passage of fluid under pressure is maintained through which fluid may flow from the passage 7 past the valve 5 to the passage 11 when the valve is in open position and in engagement with the stop flange 12.

While I have described but one embodiment of the invention, it is obvious that many changes, additions and omissions may be made in the valve structure disclosed without departing from the spirit of the invention.

Having now described my invention, what I claim as new and desire to secure by Letters Patent, is:

1. A check valve device comprising a casing having a valve chamber and a valve seat, a cover for the casing having a stop member spaced from said seat, and a valve within said chamber disposed for movement between said seat and said member, said valve comprising a body of yielding material in which a metal guide disc is embedded, said disc having guide portions extending radially from the body for engaging the walls of said chamber for centering and guiding said valve within said chamber, and said body having on one side a flat face for engaging said valve seat and on the other side a notched face for engaging said member for providing a passage between said valve and said member, through which fluid under pressure may pass when the body is in engagement with said member.

2. A check valve device comprising a casing having a valve chamber and a valve seat, a cover for the casing having a stop member spaced from said seat, a valve structure within said chamber disposed for movement between and engagement with said seat and said member and a spring interposed between said cover and said valve for urging said valve toward said seat, said valve comprising a body portion of yielding material having a recess on one side for receiving and centering said spring and a relatively hard seat member for engaging said spring and embedded in said body portion.

3. A check valve device comprising a casing having a valve chamber and a valve seat, a cover for the casing having a stop member spaced from said seat, a valve structure within said chamber disposed for movement between and engagement with said seat and said member and a spring interposed between said cover and said valve for urging said valve toward said seat, said valve comprising a body portion of yielding material having a recess on one side for receiving and centering said spring and a relatively hard seat member for engaging said spring and embedded in said body portion and having radially extending guide lugs projecting from the peripheral edge of said body portion and constituting centering guides for said valve structure.

ELLIS E. HEWITT.